US008874089B1

(12) United States Patent
Daniel

(10) Patent No.: US 8,874,089 B1
(45) Date of Patent: Oct. 28, 2014

(54) SYSTEM AND METHOD OF POSTING A VIDEO MAP LOCATION ON A SOCIAL NETWORK

(76) Inventor: Codrington Damion Daniel, Miami, FL (US)

( * ) Notice: Subject to any disclaimer, the term of this patent is extended or adjusted under 35 U.S.C. 154(b) by 8 days.

(21) Appl. No.: 13/562,161

(22) Filed: Jul. 30, 2012

Related U.S. Application Data

(60) Provisional application No. 61/512,619, filed on Jul. 28, 2011.

(51) Int. Cl.
*H04M 3/42* (2006.01)

(52) U.S. Cl.
USPC .................................. 455/414.1; 707/736

(58) Field of Classification Search
USPC .......... 348/231.3; 382/103; 455/414.1–414.4, 455/456.1–457
See application file for complete search history.

(56) References Cited

U.S. PATENT DOCUMENTS

| 2011/0129120 A1* | 6/2011 | Chan ............................. 382/103 |
| 2012/0147216 A1* | 6/2012 | Tysowski ................... 348/231.3 |

* cited by examiner

*Primary Examiner* — Kashif Saddiqui
(74) *Attorney, Agent, or Firm* — Carol N. Green, Esq.

(57) ABSTRACT

A system comprising of at least one mobile communication device including at least one computer processor positioned within, and an application program comprising of computer executable instructions operative to perform any one or more of the following: activate at least one recording means to record a video; receive input of a description of a recorded video; activate the location determining means to orient itself and determine and store the absolute location of the at least one mobile communication device; link the recorded at least one video with the absolute location; convert the recorded at least one video as linked with the absolute location to create at least one video map location; and instruct the communication means to transmit the video map location for posting to a network site on a computer network where it is displayed as a clickable icon on a map display on the network site.

13 Claims, 7 Drawing Sheets

SYSTEM AND METHOD OF POSTING A VIDEO MAP LOCATION ON A SOCIAL NETWORK

PRIORITY CLAIM

This patent application is a non-provisional continuation in part of, and claims priority to: U.S. Provisional Patent Application Ser. No. 61/512,619 titled A System And Method Of Posting A Video Map Location On A Social Network" filed Jul. 28, 2011. The entire disclosure of the afore-mentioned patent application is incorporated by reference as if fully stated herein.

FIELD OF THE INVENTION

The present disclosure relates generally to electronics systems, and more specifically to posting a video on a social networking website wherein the system and method comprises of at least one mobile communication device including at least one computer processor positioned within, and an application program comprising of computer executable instructions operative to perform any one or more of the following: activate at least one recording means to record a video; receive input of a description of a recorded video; activate the location determining means to orient itself and determine and store the absolute location of the at least one mobile communication device; link the recorded at least one video with the absolute location; convert the recorded at least one video as linked with the absolute location to create at least one video map location; and instruct the communication means to transmit the video map location for posting to a network site on a computer network where it is displayed as a clickable icon on a map display on the network site.

SUMMARY OF THE PRESENT INVENTION

The present invention relates generally to a system and method of posting a video map location on a social network. In some embodiments, system comprises of: at least one mobile communication device that includes at least one computer processor positioned within, in electronic communication with at least one recording means, at least one communications means and location determining means; and an application program comprising of computer executable instructions readable by the at least one computer processor, and operative to perform any one or more of the following: launch the video posting application on the at least one mobile communication device; activate the at least one recording means to record at least one video; receive input of a description of a recorded at least one video; activate the location determining means to orient itself and determine the absolute location of the at least one mobile communication device; store the absolute location of the mobile communication device in its memory means; link the recorded at least one video with the absolute location of the mobile communication device; convert the recorded at least one video as linked with the absolute location of the mobile communication device to create at least one video map location; and instruct the communication means to transmit the at least one video map location for posting to a network site on a computer network where it is displayed as a clickable icon on a map display on the network site.

System and method also includes a server configured for hosting the network site on the computer network, wherein the network site includes computer executable instructions operative to perform any one or more of the following: receiving the at least one video map location; linking the at least one video map location to the clickable icon; display the map display with one or more clickable icons positioned thereon in geographical locations on the map representative of the absolute location where each at least one video was recorded; provide for the downloading and playing of the at least one video when the clickable icon is clicked; providing public access to the map with the clickable icons dependent on the security settings for the author of the at least one video; and display at least one instant messaging function on the mobile communication device. The at least one recorded video is pulled from a server for display on the network site.

Location determining means includes a global positioning system module configured for communicating with a satellite network to determine the absolute location of the mobile communication device.

In some embodiments, method comprises of: activating the at least one recording means to record at least one video; receiving input of a description of a recorded at least one video; activating the location determining means to orient itself and determine the absolute location of the at least one mobile communication device; storing the absolute location of the mobile communication device in the mobile communication device's memory means; linking the recorded at least one video with the absolute location of the mobile communication device; converting the recorded at least one video as linked with the absolute location of the mobile communication device to create at least one video map location; and instructing the mobile communication device's communication means to transmit the at least one video map location for posting to a network site on a computer network where it is displayed as a clickable icon on a map display on the network site.

Method further includes providing a server configured for hosting the network site on the computer network wherein the network site includes computer executable instructions executable by the server's processor and operative for: receiving at least one video map location; converting the at least one video map location into video and absolute location; storing the converted video in a manner that links the video with the absolute location; displaying the converted video as a clickable icon on a map display wherein the clickable icon is positioned thereon in a geographical location on the map representative of the absolute location where the at least one video was recorded; providing for the downloading and playing of the at least one video when the clickable icon is clicked; and providing public access to the map with the clickable icons dependent on the security settings for the author of the at least one video. In some embodiments, the at least one recorded video is pulled from a server using the at least one communications means.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF THE PREFERRED EMBODIMENT

Figure 1:
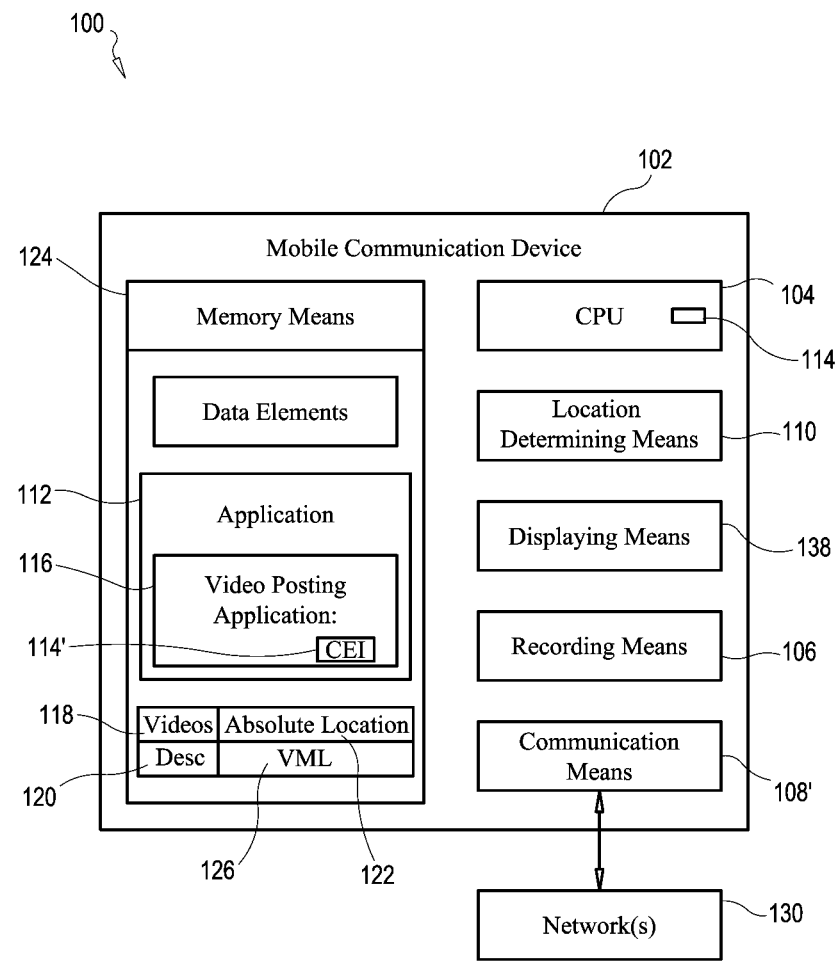
FIG. 1 is an illustrative view of the system of the present invention.

The following discussion describes in detail one embodiment of the system of the invention (and several variations of that embodiment). However, this discussion should not be construed as limiting the invention to those particular embodiments as practitioners skilled in the art will recognize numerous other embodiments as well. For definition of the complete scope of the invention, the reader is directed to appended claims.

Turning now descriptively to the drawings, in which similar reference characters denote similar elements throughout the several views.

Systems

FIG. 1 is an exemplary system 100 of the invention according to one embodiment of the system 100. System 100 includes an exemplary at least one mobile communication device 102, which includes at least one computer processor 104 positioned within, in electronic communication with at least one recording means 106, at least one communications means 108 and location determining means 110; and an application program 112 comprising of computer executable instructions 114 readable by the at least one computer processor 104, and operative to perform any one or more of the following: launch the video posting app 116 on the at least one mobile communication device 102; activate the at least one recording means 106 to record at least one video 118; receive input of a description 120 of a recorded at least one video 118; activate the location determining means 110 to orient itself and determine the absolute location 122 of the at least one mobile communication device 102; store the absolute location 122 of the at least one mobile communication device 102 in its memory means 124; link the recorded at least one video 118 with the absolute location 122 of the mobile communication device 102; convert the recorded at least one video 118 as linked with the absolute location 122 of the mobile communication device 102 to create at least one video map location 126; and instruct the communication means 108 to transmit the at least one video map location 126 for posting to a network site 128 on a computer network 130 where it is displayed as a clickable icon 132 on a map display 134 on the network site 128. The at least one video 118 may be any type of video, including, but not limited to, a live video, a live music video, a streamed music video, a pre-recorded music video, and the like. In some embodiments, the length of the at least one video 118 may be based on a prescribed period of time, e.g. 45 seconds, 3 minutes, 5 minutes or 10 minutes, etc. In other embodiments, the length of the at least one recorded video 118 is unrestricted.

Mobile communication device 102 may be any type of device configured with means for communicating wirelessly and/or wired with other mobile communication devices 102, 102', such as but not limited to, cellular phones (e.g., an iPhone, Android, Palm, Blackberry, or any "smart phone" as are generally known and used in the arts), location-aware portable phones (such as GPS), a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network, local area network, wide area network such as the Internet, or any other type of network device that may communicate over a network. Mobile communication device 102 may include various hardware components, e.g. a computer processor 104, recording means 106, one or more communication means 108, and location determining means 110.

Computer processor 104 may be any type of processor, such as, but not limited to, a central processing unit (CPU), a microprocessor, a video processor, a front end processor, a coprocessor, a single-core central processor, a multi-core processor, and the like.

Recording means 106 may include any kind of recording device, such as, but not limited to, an audio recording device, such as a microphone, or a video recording device, such as a camera, or a combination of both an audio and a video recording device.

Mobile communication device 102 is equipped with communication means 108 either electrically or mechanically connected to processor 104. In the case of electronic connections, the electronic connections may be wired and/or wireless. In some embodiments, communication means 108 may be a wireless communication means 108, which employ short range wireless protocol, such as, but not limited to, a radio frequency transceiver, a radio frequency receiver, and/or a radio frequency transmitter. In embodiments where the wireless communication means 108 is a radio frequency receiver, the radio frequency receiver may be any type of radio frequency receiver, including, but not limited to, a positioning system receiver, such as a global positioning system receiver and a local positioning system receiver, such as a Wi-Fi positioning system receiver. In other embodiments, the communication means 108 may employ wireless protocols like Blue Tooth, ZigBee, 702.11 series, or a wireless modem, such as, but not limited to, a global system for mobile communications (GSM) modem, or any other short range wireless protocol that is well known and used in the arts and other future short range wireless protocol suitable for transmitting and receiving data. Communication means 108 are operative to transmit or receive electronic communications, i.e. digital video 118, data, text, pictures, audio and the like via a short range wireless protocol, such as, but not limited to, a radio frequency receiver, a radio frequency transmitter, or a radio frequency transceiver.

Mobile communication device 102 also includes location determining means 110, e.g. a Global Positioning Systems ("GPS") transponder as is well known and used in the arts, which upon activation, orients itself by searching for signals of GPS satellite network 140 and determines the absolute location 122 of the mobile communication device 102, which once determined may be stored in the mobile communication device's memory means 124.

In some embodiments, system 100 may include an application program, or module ("app") 112, which may comprise in part of a browser, such as for use on the mobile communication device 102, or a similar browsing device. The application 112 manages other applications 112, 112' that are executable on the mobile communication device 102, e.g. the video posting application ('app") 116.

Video posting app 116 may be any type of software application, such as a standalone application designed to run on a mobile platform, such as a mobile device running an operating system, such as iOS™, Android™, Windows Mobile™, Blackberry™, and the like. video posting app 116 may be operative for an iPhone, any other "smart phone", mobile device, cellular phone, PDA, or any other mobile communication device 102 capable of handling transactions dealing with dynamic content, digital data, e.g. videos and audio, object, application, or software and the like. In another embodiment, the video posting app 116 may be designed to include a component that resides on a server computer 136 for hosting a network site 128, such as FACEBOOK™ or JUSTSYNC™ on a computer network 130.

In some embodiments, video posting app 116 may include a component that resides on a server computer 136 or may have a software program residing in memory. A mobile communications device 102 may have the video posting app 116 residing in local memory or it may be downloadable to the mobile communications device 102 from the server 136. For example, in one embodiment, the video posting app 116 may be on a mobile communication device 102 (such as an iPhone, Blackberry, or other 'smart phone') and the full-sized software program may be on the server 136, where communications may occur over a computer network 130 or directly, either wired or wirelessly.

Server 136 includes but is not limited to a network enabled computer, a laptop or personal digital assistant subject to wired/wireless connectivity, which is configured with a computer processor 104'.

Computer processor 104 includes computer executable instructions 114 where the computer executable instructions 114 are operative to perform all the necessary functions for the system 100 and methods disclosed herein, including but not limited to launching the video posting app 116 which also includes computer executable instructions 114.

In some embodiments, mobile communication device 102 may include at least one memory means 124 either electrically or mechanically connected to the at least one computer processor 104. In the case of electronic connections, the electronic connections may be wired and/or wireless connections. Memory means 124 may comprise of a storage device and may include memory, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. Memory means 124 may be used to store videos 118, 118' and the like in case for example an immediate upload is not available, the videos 118, 118' may be retrieved from memory means 124 using the computer processor 104.

The computer executable instructions 114, 114' may be any type of computer executable instructions 114, 114', which may be in the form of a computer program, the program being composed in any suitable programming language or source code, such as C++, C, JAVA, JavaScript, HTML, XML, and other programming languages.

Computer executable instructions 114, 114', 114" are operative to perform any all the necessary functions for the system 100 and methods disclosed herein which may include any one or more of the following: launch the video posting app 116 on the at least one mobile communication device 102; activate the at least one recording means 106 to record at least one video 118; receive input of a description 120 of a recorded at least one video 118; activate the location determining means 110 to orient itself and determine the absolute location 122 of the at least one mobile communication device 102; store the absolute location 122 of the at least one mobile communication device 102 in its memory means 124; link the recorded at least one video 118 with the absolute location 122 of the mobile communication device 102; convert the recorded at least one video 118 as linked with the absolute location 122 of the mobile communication device 102 to create at least one video map location 126; and instruct the communication means 108 to transmit the at least one video map location 126 for posting to a network site 128 on a computer network 130 where it is displayed as a clickable icon 132 on a map display on the network site 128.

In some embodiments, mobile communication device 102 may have one or more graphical icons 132, 132' or other visual indicators displayed thereon that allows user to launch and access the video posting app 116. When a user selects the video posting application icon 134 (e.g. by touching a touchscreen, or selecting it using a pointing device, roller ball, arrow keys, or other controller), the user may access the video posting app 116.

Mobile communication device 102 may include any kind of displaying means 138, such as, but not limited to: a liquid crystal display ("LCD") screen, a light emitting diode ("LED") display, touchpad or touch screen display, and/or any other means known in the arts for emitting a visually perceptible output. Mobile device's processor 104 is in electronic communication with its displaying means 138. In other embodiments, displaying means 138 is wirelessly connected to processor 104. Displaying means 138 may include a control means, such as, but not limited to, a touch screen, a stylus, and the like. In some embodiments, displaying means may be electronically connected to a client device 102' according to the hardware and software protocols that are known and used in the arts. Processor 104 controls the mobile device's displaying means 138, which is configured for displaying input for a description (text, audio or graphics) of the at least one or more recorded videos 118, 118', absolute locations 122, 122' video map locations 126, 126 and the like.

Figure 2:
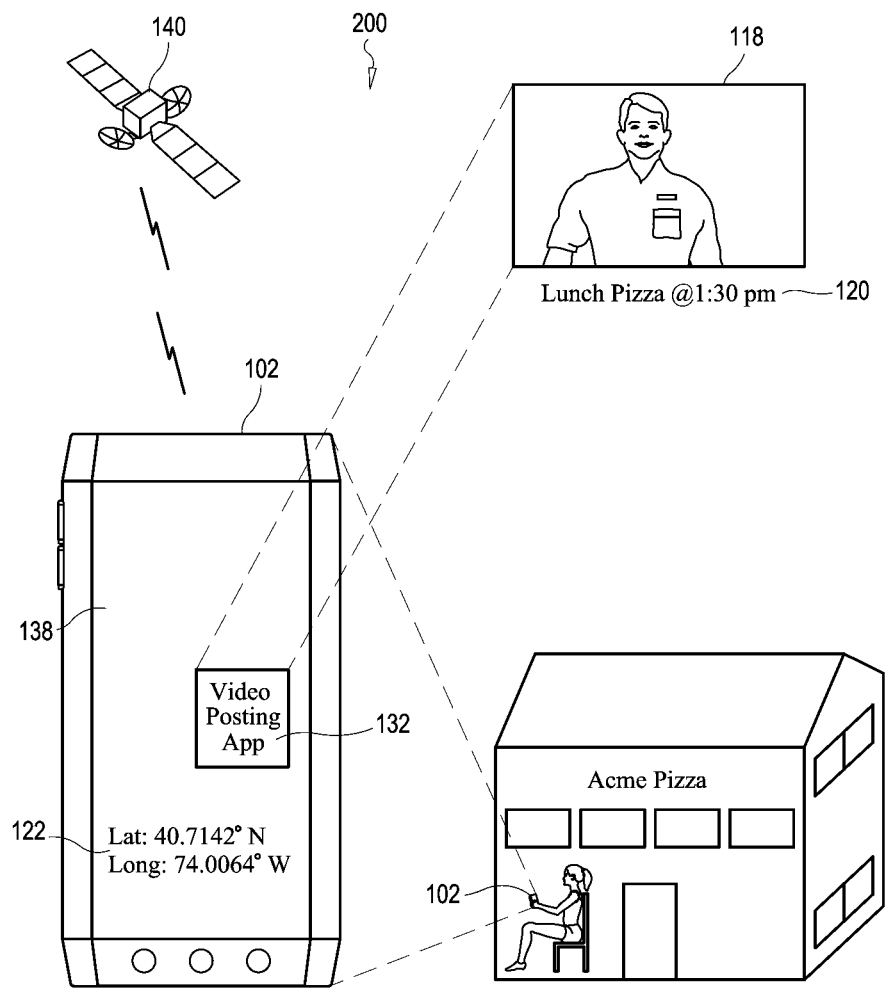
FIG. 2 shows an example of the system in use according to one embodiment.

FIG. 2 shows an example of the system 200 in use according to one embodiment. In some embodiments, the video posting app 116 may appear as an icon 132 that may be manually activated to launch the app 116, while in some embodiments the video posting app 116 is automatically launched as soon as the mobile communication device 102 is turned on. In either embodiment, once the video posting app 116 is activated, the user may start recording at least one or more videos 118, 118' at his/her current location. The location determining means 110 orients itself by searching for signals of GPS satellite constellation 140 and determines the absolute location 122 of the mobile communication device 102, which once determined may be stored in the mobile communication device's memory means 124. The video posting app 116 provides for the input of a description 120 of the recorded video providing additional disclosure to all authorized viewers once the recorded video 118 is posted.

Figure 3A:
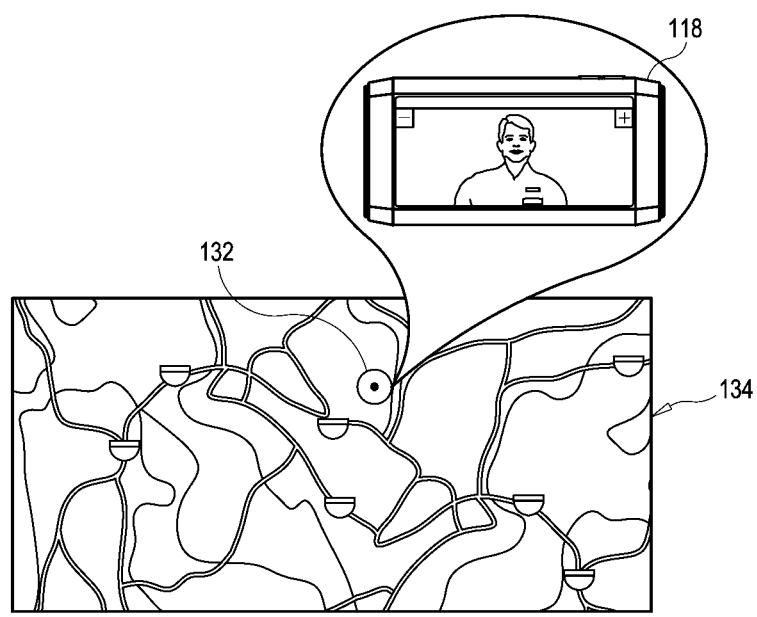
FIGS. 3A-3C show exemplary embodiments of the system of the video posting app in use according to one embodiment.
Figure 3B:
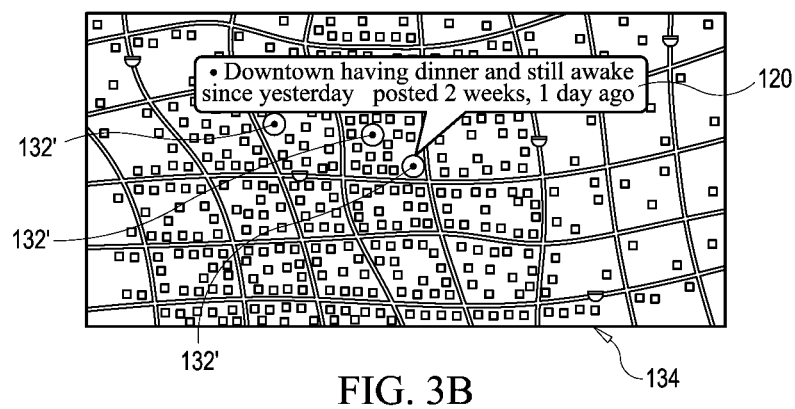
Figure 3C:
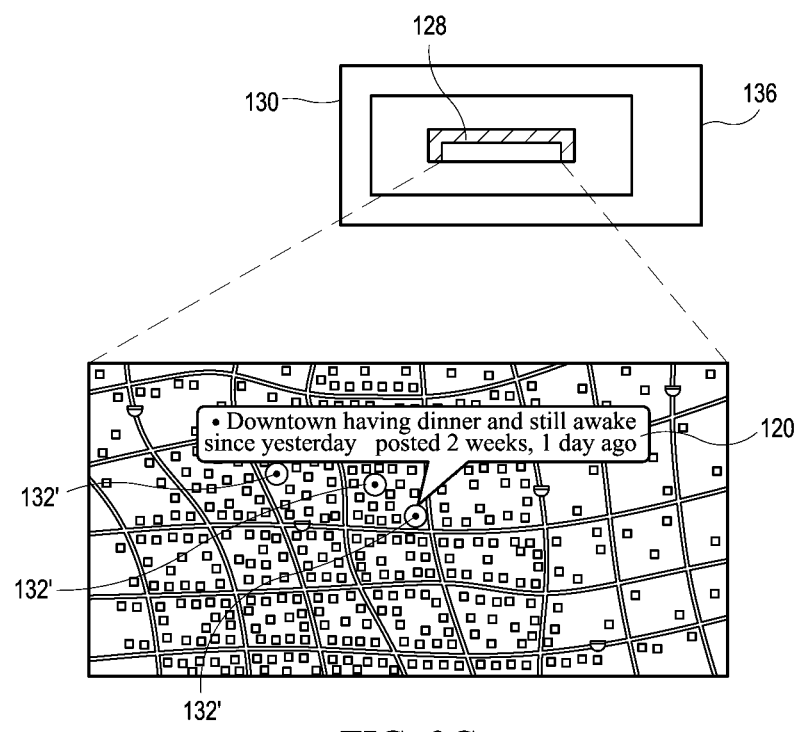

FIGS. 3A-3C show exemplary embodiments of the system 100 and method of the video posting app 116 in use according to one embodiment. The network site 128 as hosted by the server may include a social networking website wherein the videographer/member is able to post his/her video map locations 126 as clickable icons 132, 132' that are published on the app 116 component that resides on networking site 128 as hosted by the server 136. As such, authorized viewers, e.g. family and friends, may view the map display 134, click on the clickable icons 132, 132 which causes the server 136 to download the video 118 for viewing. As such, authorized viewers may hear comments, postings, etc. concerning the one or more absolute locations 122, 122' visited or the user's comments and views as recorded at the particular absolute location 122. In reviewing the map display 134, a third party viewer is able to see at a glance the geographical region covered by the videographer. As can be appreciated, several varying useful utilities can be generated from the system 100 and methods disclosed herein as videographers may even coin a game to see who is able to visit the most absolute locations 122, 122' in the shortest span of time.

In some embodiments, the video map location 126 may be linked with a message post for a particular absolute location 122 without being linked to a corresponding recorded video 118 as shown in FIG. 3B. In that embodiment, the icons 132, 132', 132" may be displayed on the map display 134 with a message post and accessed by either clicking on the icon 132 or using a touch screen to access and activate the icon 132 for the display of the message post. In some embodiments, the message post is readily displayed on the map display 134 without having to individually access the icons 132, 132'.

In some embodiments, at least one recorded video 118 may be pulled or pushed from a server 136 using at least one communications means 108.

In another embodiment, the at least one instant messaging function may be populated with instant messages transmitted or received using communications means 108. It should be understood that all of the data displayed in the various functions and sections described herein may be pushed or pulled from a server 136 either directly through a computer network 130, such as the Internet. System 100 may connect directly to such a network, or through a network enabled device (such as by being tethered, e.g. Bluetooth tethering).

Methods

Figure 4:
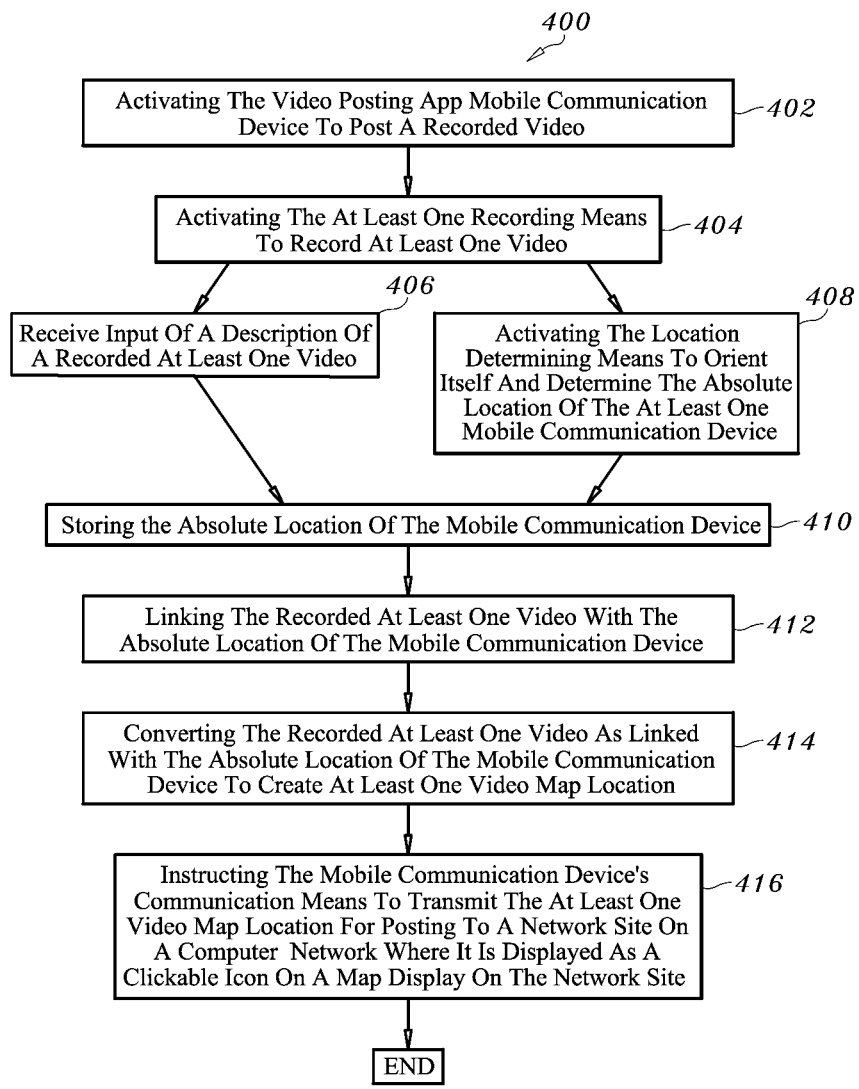
FIG. 4 is an exemplary method of the invention according to one embodiment.

FIG. 4 is an exemplary method 400 of the invention according to one embodiment. Method 400 comprises of activating the video posting app 116 on a mobile communication device 102 to post a recorded video 118 (step 402). As previously discussed in conjunction with the systems 100-300, mobile communication device 102 may be any type of device configured with means for communicating wirelessly and/or wired with other mobile communication devices 102, 102', such as but not limited to, cellular phones (e.g., an iPhone, Android, Palm, Blackberry, or any "smart phone" as are generally known and used in the arts), location-aware portable phones (such as GPS), a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network 130, local area network, wide area network such as the Internet, or any other type of network device that may communicate over a network.

Method 400 further comprises of activating the at least one recording means 106 to record at least one video 118 (step 404). Recording means 106 may include any kind of recording device, such as, but not limited to, an audio recording device, such as a microphone, or a video recording device, such as a camera, or a combination of both an audio and a video recording device. The at least one video 118 may be any type of video, including, but not limited to, a live video, a live music video, a streamed music video, a pre-recorded music video, and the like. In some embodiments, the length of the at least one video 118 may be based on a prescribed period of time, e.g. 45 seconds, 3 minutes, 5 minutes or 10 minutes, etc. In other embodiments, the length of the at least one recorded video 118 is unrestricted.

Mobile communication device 102 receives input of a description 120 of a recorded at least one video 118 (step 406) from the user, e.g. "DOWNTOWN. HAVING DINNER AND STILL AWAKE SINCE YESTERDAY." In some embodiments, the description of the recorded at least one video 118 may be limited to a stated number of characters, or icons, whereas in other embodiments, the length of the description 120 at least one recorded video 118 is unlimited. In some embodiments, date and time information is attached to the recorded video 118 and is available for display when viewed by clicking the clickable icon 118 on the map display 134.

In some embodiments, once the mobile communication device 102 is turned on the location determining means 110 is activated. In some embodiments, when the video posting app 116 is launched the location determining means 110 is automatically activated while in some embodiments the location determining means 110 is selectively activated. In either embodiments, method 400 includes activating the location determining means 110 to orient itself and determine the absolute location 122 of the at least one mobile communication device 102 (step 408) simultaneously while the video 118 is being recorded. Method 400 further comprises storing the absolute location 122 of the mobile communication device 102 in the mobile communication device's memory means 124 (step 410). In this manner if the mobile communication device 102 has no satellite reception and transmission is not available, the video 118, absolute location 122, description 120 of the video 118 and/or the video map location 126 may be stored for future transmission when possible.

The computer executable instructions 114 of the video posting app 116 are further operative for linking the recorded at last one video 118 with the absolute location 122 of the mobile communication device 102 (step 412); converting the recorded at least one video 118 as linked with the absolute location 122 of the mobile communication device 102 to create at least one video map location 126 (step 414); and instructing the mobile communication device's communication means 108 to transmit the at least one video map location 126 for posting to a network site 128 on a computer network 130 where it is displayed as a clickable icon 132 on a map display 134 on the network site (step 416).

In some embodiments, method 400 further comprises receiving a request to post the recorded video map location 110 to an application, e.g. a social network service. Once the user/videographer elects to post the video map location 110, the mobile communication device's communications means 106 transmits the recorded video 118 and absolute location 122 that has been converted into a video map location 110 to the application program, where the video map location 126 is represented graphically on a map display 134 by a clickable icon 132 for viewing by authorized third parties depending on the user's security settings. In some embodiments, depending on the number of posted video map locations 126, 126' the map display 134 may be graphically depicted larger or smaller to graphically represent all the icons 132, 132', 132" indicative of the geographical area travelled by the videographer in recoding the posted video map locations 126, where for example the user may have a plurality of recorded videos 118, 118', 118" converted into video map locations 126 and displayed as clickable icons 132, 132', 132". In that event, the map display 134 may cover a more expansive geographical area in order to accurately post the icons 132, 132' in the various absolute locations 122, 122' of the user as recorded. In some embodiments, the map display is expandable regardless of the number of icons 132, 132'.

Figure 5:
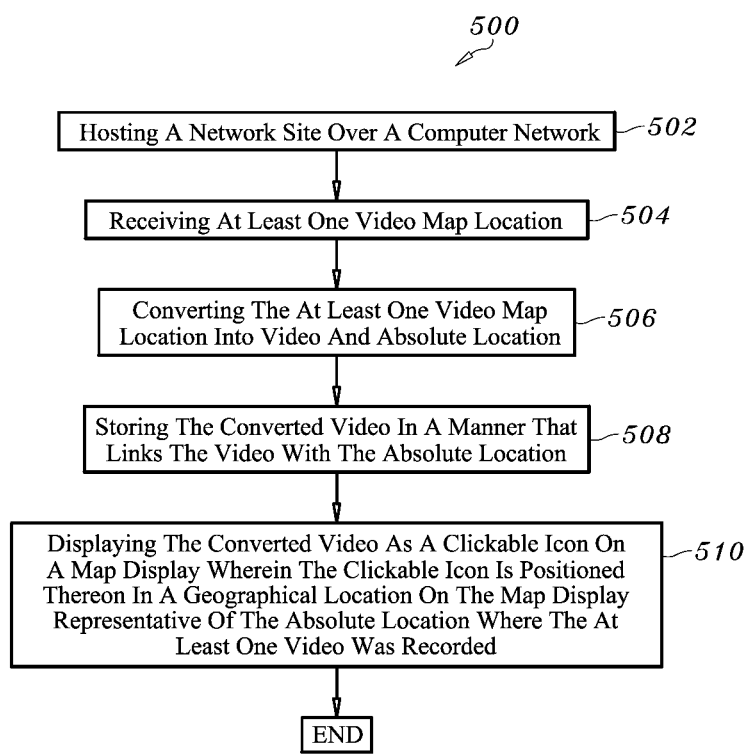
FIG. 5 is an exemplary method of the invention according to one embodiment.

FIG. 5 is an exemplary method 500 of the invention according to one embodiment. Method 500 comprises of the server computer 136 hosting a network site 128 over a computer network 130 (step 502). The network site 128 includes computer executable instructions 114' readable by the at least one computer processor 104, and operative for receiving at least one video map location 126 (step 504); converting the at least one video map location 126 into video 118 and absolute location 122 (step 506); storing the converted video 118 in a manner that links the video 118 with the absolute location 122 (step 508); and displaying the converted video 118 as a clickable icon 132 on a map display 134 wherein the clickable icon 132 is positioned thereon in a geographical location on the map display 134 representative of the absolute location 122 where the at least one video 118 was recorded (step 510).

In some embodiments, method 500 further comprises of providing for the downloading and playing of the at least one video 118 when the clickable icon 132 is clicked, where public (third party) to the map display 134 with the clickable icons 132 representative of the various absolute locations 122, 122' that the videos 118, 118' were recorded is dependent on the security settings for the author of the at least one video. In some embodiments, once the icon 132 is clicked, the at least one recorded video 118 is pulled from the server's memory means 124.'

In a further embodiment, instant messaging function may be any type of instant messaging function, such as a private one on one instant messaging, a private group instant messaging session (such as a chat room), or a public instant messaging session. In some embodiments, the instant messaging function may be directly linked to the at least one recorded video 118, so that when the recording of the video 118 is completed, the video 114 is automatically posted to the video posting app 116 using instant messaging function. In an alternate embodiment, the user may review and/or edit the recorded video 118 prior to posting it.

In a further embodiment, instant messaging function may comprise a messaging/post feed from at least one social media service, such as, but not limited to, JustSync.com, Facebook.com, Twitter.com, MySpace.com, Orkut.com, Friendster.com, and the like. In yet another embodiment, instant messaging function may comprise of a social media service aggregator, wherein messages, posts, and updates from multiple social media service providers may be aggregated and displayed.

Methods

Hardware and Operating Environment

This section provides an overview of example hardware and the operating environments in conjunction with which embodiments of the inventive subject matter can be implemented.

A software program may be launched from a computer readable medium in a computer-based system 600 to execute the functions defined in the software program. Various programming languages may be employed to create software programs designed to implement and perform the methods 400 & 500 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 6 below.

Figure 6:
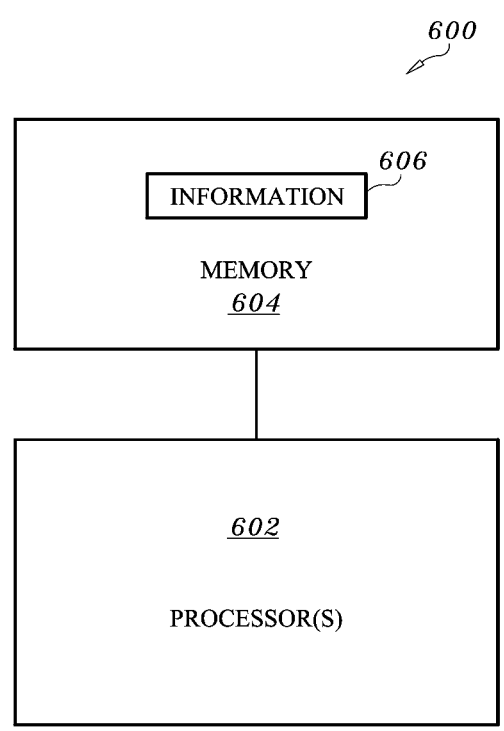
FIG. 6 is a block diagram representing an article according to various embodiments.

FIG. 6 is a block diagram representing an apparatus 600 according to various embodiments. Such embodiments may comprise a computer, a memory system, a magnetic or optical disk, some other storage device, or any type of electronic device or system. The apparatus 600 may include one or more processor(s) 604 coupled to a machine-accessible medium such as a memory 602 (e.g., a memory including electrical, optical, or electromagnetic elements). The medium may contain associated information 606 (e.g., computer program instructions, data, or both) which, when accessed, results in a machine (e.g., the processor(s) 604) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising of:
   a. at least one mobile communication device that includes at least one computer processor positioned within, in electronic communication with at least one recording means, at least one communications means and location determining means; and
   b. an application program comprising of computer executable instructions readable by the at least one computer processor, and operative to perform any one or more of the following:
      i. launch a video posting application on the at least one mobile communication device;
      ii. activate the at least one recording means to record at least one video;
      iii. receive input of a description of a recorded at least one video;
      iv. activate the location determining means to orient itself and determine the absolute location of the at least one mobile communication device;
      v. store the absolute location of the mobile communication device in its memory means;
      vi. link the recorded at least one video with the absolute location of the mobile communication device; and
      vii. convert the recorded at least one video as linked with the absolute location of the mobile communication device to create at least one video map location that is automatically posted to the video posting application that instructs the communication means to transmit the at least one video map location for automatic posting to a network site on a computer network where it is displayed as a clickable icon on a map display on the network site.

2. The system of claim 1, further including a server configured for hosting the network site on the computer network.

3. The system of claim 1, wherein the network site includes computer executable instructions operative to perform any one or more of the following:
   i. receive the at least one video map location;
   ii. linking the at least one video map location to the clickable icon;
   iii. display the map display with one or more clickable icons positioned thereon in geographical locations on the map representative of the absolute location where each at least one video was recorded;
   iv. provide for the downloading and playing of the at least one video when the clickable icon is clicked; and
   v. providing public access to the map with the clickable icons dependent on the security settings for the author of the at least one video.

4. The system of claim 1, wherein the location determining means includes a global positioning system module configured for communicating with a satellite network to determine the absolute location of the mobile communication device.

5. The system of claim 1, wherein the at least one recorded video is pulled from a server for display on the network site.

6. A method comprising of:
   a. activating the at least one recording means to record at least one video;
   b. receiving input of a description of a recorded at least one video;
   c. activating the location determining means to orient itself and determine the absolute location of the at least one mobile communication device;
   d. storing the absolute location of the mobile communication device in the mobile communication device's memory means;
   e. linking the recorded at least one video with the absolute location of the mobile communication device;
   f. converting the recorded at least one video as linked with the absolute location of the mobile communication device to create at least one video map location that is automatically posted to a video posting application; and
   g. instructing the mobile communication device's communication means to transmit the at least one video map location for automatic posting to a network site on a computer network where it is displayed as a clickable icon on a map display on the network site.

7. The method of claim 6, further including providing a server configured for hosting the network site on the computer network.

8. The method of claim 6, wherein the network site includes computer executable instructions operative to perform any one or more of the following:
   i. receive the at least one video map location;
   ii. linking the at least one video map location to the clickable icon;
   iii. display the map display with one or more clickable icons positioned thereon in geographical locations on the map representative of the absolute location where each at least one video was recorded;
   iv. provide for the downloading and playing of the at least one video when the clickable icon is clicked; and
   v. providing public access to the map with the clickable icons dependent on the security settings for the author of the at least one video.

9. The method of claim 6, wherein the location determining means includes a global positioning system module configured for communicating with a satellite network to determine the absolute location of the mobile communication device.

10. A method comprising of:
   a. hosting a network site on a computer server over a computer network;
   b. receiving at least one video map location that was automatically posted to a video posting application;
   c. converting the at least one video map location into video and absolute location;
   d. storing the converted video in a manner that links the video with the absolute location; and
   e. displaying the converted video as a clickable icon on a map display wherein the clickable icon is positioned thereon in a geographical location on the map representative of the absolute location where the at least one video was recorded.

11. The method of claim 10 further comprising providing for the downloading and playing of the at least one video when the clickable icon is clicked.

12. The method of claim 10 further comprising providing public access to the map with the clickable icons dependent on the security settings for the author of the at least one video.

13. The method of claim 10, wherein the at least one recorded video is pulled from a server using the at least one communications means.

\* \* \* \* \*